3,297,033
SURGICAL SUTURES
Edward Emil Schmitt, Norwalk, Conn., and Rocco Albert Polistina, Port Chester, N.Y., assignors to American Cyanamid Company, Stamford, Conn., a corporation of Maine
No Drawing. Filed Oct. 31, 1963, Ser. No. 320,543
9 Claims. (Cl. 128—335.5)

This invention relates to a synthetic absorbable surgical suture consisting of (1) a polyhydroxyacetic ester and (2) structural absorbable surgical elements of the same material.

Absorbable sutures in current use by the medical profession and veterinary profession for use in humans and animals are made from animal tissues, primarily of collagen, either by slitting natural collagen tissues, such as the serosa layer of an animal intestine and twisting, tanning, and sizing, or by regeneration of collagen from a casting or spinning operation. The sutures meeting with greatest acceptance are formed by slitting animal intestines, separating the serosa layer, then twisting and *chromacizing*. Because of the nature of the tissues being used, and natural biological variation, difficulty is encountered in getting uniformity of size, texture, strength, and absorption rate. Any material of biologic origin may have antigenic characteristics that in at least some instances cause complications. Necessarily, the sutures are of short segments. A usual length is about five feet.

Obviously, it has long been considered desirable to prepare an absorbable synthetic suture by a spinning process, such as used in the preparation of synthetic fibers, but no material has been known which could be so formed and which would meet medical requirements as to strength, handleability, non-toxicity, and also most importantly, predictable and uniform absorbability. Some of the common synthetic fibers such as nylon Orlon, polyethylene and polypropylene have been used instead of silk as non-absorbable sutures.

A suture to be acceptable must be reasonably strong, must have good handling characteristics, for example, it must be throwable so that the surgeon can place it where he desires, and it must have knot strength characteristics and knotability so that knots can be tied in the suture. The knot must be solid so that it will not slip and the strength of the knotted suture, while not as strong as in straight pull, is desirably as close to straight pull as possible. In many instances for testing, the suture is tied in a loop with a square knot, or a surgeon's knot, and the strength of the loop to failure, whether breakage or slippage occurs, is used as a criterion of the strength of the suture. The straight pull strength is not nearly as important as the knot pull strength.

Absorbable sutures are those which are absorbed in living tissue and for surgical purposes the absorption must be at a reasonably consistent rate, and must occur within a reasonable time period. For different purposes and in different types of tissue the rate of absorption may vary but in general an absorbable suture should have as high a portion of its original strength as possible for at least three days, and sometimes as much as fifteen days, and preferably should be completely absorbed by muscular tissue within from forty-five to ninety days. The rate of absorption in other tissues may vary even more.

In common with many biological systems, the requirements are not absolute and the rate of absorption as well as the short-term strength requirement varies from patient to patient and at different locations within the body. In general, the medical profession has found it necessary to accept sutures which are less than perfect but which are available.

It has now been found that fibers of polyhydroxyacetic esters, when stretch oriented, have knot strength, handleability, non-toxicity, and—most surprisingly—absorbability characteristics which are surgically desirable and conveniently close to the characteristics of collagen sutures, frequently referred to as "catgut." Because they are produced under controlled conditions, the present sutures have much more uniform overall properties. Since the sutures may be produced as a continuous strand, the packaging and handling of the sutures is particularly economical as contrasted with similar operations for "catgut."

Monofilament sutures are conveniently formed from the polyhydroxyacetic esters. Built-up polyfilamentary sutures are formed from a plurality of smaller filaments, which are spun, woven or braided. This is a new class of absorbable sutures. In the past absorbable sutures have been almost exclusively monofilament because of requirements in manufacture and limitations inherent in the material.

The polyhydroxyacetic esters may be formed as tubes or sheets for surgical repair and may also be spun as thin filaments and woven or felted to form absorbable sponges or absorbable gauze, or used in conjunction with other structures or as prosthetic devices, within the body of a human or animal where it is desirable that the structure have short-term strength, but be absorbable. The useful embodiments include tubes, including branched tubes or T's, for artery, vein or intestinal repair, nerve splicing, tendon splicing, sheets for tying up and supporting damaged kidney, liver and other intestinal organs, protecting damaged surface areas such as abrasions, particularly major abrasions, or areas where the skin and underlying tissues are damaged or surgically removed.

The synthetic character and hence predictable formability and consistency in characteristics obtainable from a controlled process are highly desirable in the absorbable suture field. With sutures of catgut from natural sources, there is invariably a wider spread of strength characteristics than is to be expected with controlled synthetic products. A surgeon in using sutures is not nearly as concerned with the average strength or median strength as he is with the strength in the particular suture he is then emplacing. The surgeon must rely on the minimum assured strength of each suture rather than averages or medians for a group. Hence, a synthetic suture could even average weaker than catgut sutures but be stronger in useful strength if the minimum strength were higher than the minimum strength of catgut sutures. This could easily happen because of the greater uniformity of synthetic sutures.

Sterility is a most important characteristic of a suture. Any material to be used as a suture must have such physical characteristics that the suture can be sterilized. The most convenient method of sterilizing is by heat in which the suture is heated under such conditions that any microorganisms or deleterious materials are rendered inactive. A second common method is to sterilize using a gaseous sterilizing agent such as ethylene oxide. Other methods of sterilizing include radiation by X-rays, gamma rays, neutrons, electrons, etc., or high intensity ultrasonic vibrational energy or combinations of these methods. The present sutures have such physical characteristics that they may be sterilized by any of these methods.

Polyhydroxyacetic ester is sometimes referred to as polyglycolide, or poly(glycolic acid) and can be considered as essentially a product of polymerization of glycolic acid, that is, hydroxyacetic acid, which in simplified form is shown by the equation:

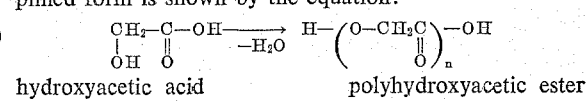

hydroxyacetic acid      polyhydroxyacetic ester

For use as a suture, preferably $n$ is such that the molecular weight is in the range of 10,000 or more. Above 100,000 the polymer is difficult to extrude.

In these molecular weight ranges the polymer has a melt viscosity at 245° C. of between about 400 and about 27,000 poises. Because the fiber is from a synthetic and controllable source, with a controlled molecular weight and controlled small percentage of comonomer, the absorbability, stiffness, and other characteristics can be modified. In general, the higher the molecular weight, the slower the rate of absorption under a given set of conditions.

Among several methods by which polyhydroxyacetic ester can be prepared, one preferred route involves the polymerization of glycolide,

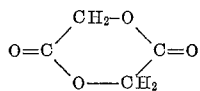

the cyclic dimeric condensation product formed by dehydrating hydroxyacetic acid. During polymerization of glycolide, the ring is broken and straight-chain polymerization occurs. Probably at least a small portion of the polymerization involves the formation of anhydride or ether linkages from a condensation of glycolic acid in a head-to-head, or tail-to-tail direction. The current state of the art is not sufficiently advanced to show with certainty the ratio of anhydride or ether linkages to ester group but indicates there are no more than a few percent of the total. A small quantity of methoxyacetic acid,

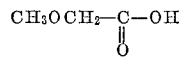

or methyl hydroxyacetic ester,

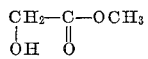

or their homologs, such as higher alkoxyacetic acids, or alkyl hydroxyacetic esters may be present during the polymerization as an end group stabilizer controlling the molecular weight and viscosity. Small quantities of other materials may be present in the chain, as for example, $d$, $l$-lactic acid, its optically active forms, homologs, and analogs. In general, plasticizers tend to interfere with crystallinity, orientation, etc., and weaken fibers, but are useful for sponges and films. Other substances may be present, such as dyes, antibiotics, antiseptics, anesthetics, and antioxidants. The surfaces of the fiber can be coated with a silicone, beeswax, and the like to modify the handling or absorption rate. Such agents have been used with conventional sutures.

The polymerization of glycolide occurs by heating with or without a catalyst, or may be induced by radiation such as X-rays, gamma rays, electron beams, etc. Polymers may also be obtained by condensing glycolic acid or chloroacetic acid with or without a catalyst under a variety of conditions. Good fibers are most readily obtained when the melt viscosity at 245° C. is about 400 to about 27,000 poises.

Polyhydroxyacetic esters have been described by such patents as United States Patent 2,668,162, Lowe, "Preparation of High Molecular Weight Polyhydroxyacetic Ester," and United States Patent 2,676,945, Higgins, "Condensation Polymers of Hydroxyacetic Acid." Higgins, 2,676,945, in column 3, lines 39 and following, describes a method of determination of melt viscosity, which is related to molecular weight.

The processes described in the above two patents can be used for producing a polymer from which sutures can be spun. Additionally, additives such as triphenylphosphite or Santo-Nox, a disulfide aromatic phenol, can be added as color stabilizers. The polymer makes a good suture in its natural state, which may be from a white to somewhat brownish. It is preferred that the suture be colored blue or green so that it stands out better against white towels or white bandages, the skin, or an operating field, which is frequently bloody.

The present sutures are stable in physiological saline for at least one month at 37° C. A braided 2-0 suture is absorbed in forty-five days in test rabbits. Test sutures appear to be satisfactory when used on human beings as they retain adequate strength long enough for a wound to heal and appear to be absorbed in approximately the same time as in test rabbits. As is common in the use of sutures, most of the experimental work is done in animals for studies of strength, rate of absorption, effect on tissue and other characteristics. Rabbits, mice, and other laboratory animals can conveniently be sacrificed and the exact details of suture absorption determined microscopically. Much of the work in human beings is necessarily predicated on the assumption that the experimental results in human beings are essentially the same as in rabbits or other test animals. Gross examination appears to confirm this assumption and such examinations, as are reasonably practical, indicate the sutures to be satisfactory, and to act the same. Obviously, human beings cannot be sacrificed for suture examination and microscopical examination of the implanted absorbable sutures must, therefore, be predicated on such test results in human beings as can be obtained by observation of living specimens and an occasional autopsy, which is dependent on the unpredictable time and place of the demise of the subject.

*Example 1*

100 parts of recrystallized glycolide (melting point 85.0 to 85.5° C.) are intimately mixed with 0.02 part of methoxyacetic acid, 0.03 part of phenoldisulfide (Santo-Nox), and 0.03 part antimony trifluoride. Separate glass tubes are each charged with approximately 20 grams of the mixture, deoxygenated by repeated evacuation and argon purging, then sealed under vacuum and heated to 185 to 190° C. for 4½ hours. On cooling a white opaque tough polyhydroxyacetic ester is produced in a 97.5% yield with a melt viscosity at 245° C. of 5,000 poises. The polymer is reheated and spun into fibers at a temperature of about 230° C. at a speed of about 150 feet per minute. The fibers produced are cooled, then drawn at about 55° C. When drawn to five times the original length a strong tough fiber is produced. Monofilaments of the fiber, gauging to 00 U.S.P. are attached to surgical needles, sealed in transparent polyester-polyethylene packets and dry sterilized by ethylene oxide permeating the seal line. The dry fibers are in condition for use as sutures. The sutures may be stored in a conditioning liquid. Alcohol-water mixtures, such as are conveniently used for catgut sutures, give improved lubricity, and are preferred by some surgeons.

*Example 2*

The polymer of the preceding example is formed into a plurality of smaller filaments, seven of which are twisted into a polyfilamentary suture, which is sterilized and used following the techniques of Example 1.

The sutures of both Examples 1 and 2 are strong, sterile, have high knot strength, and have good absorbability characteristics in both humans and animals.

The same polymers may be formed into sheets and used on the surface of the skin or internally. The use of submucosal tissue and ribbons therefrom internally is described in such patents as United States Patent 2,167,251, Rogers, "Surgical Tape of Submucosa Tissue," July 25, 1939, United States Patent 2,143,910, Didusch, "Ribbon Gut and Method of Using the Same," January 17, 1939, and United States Patent 2,127,903, Brown, "Tube for Surgical Purposes and Method of Preparing and Using the Same," August 23, 1938. The present polymer is strong if stretched but need not be stretched to be useful. Because it is a synthetic polymer the methods of forming are more versatile than in starting with naturally occurring materials. The above patents are representative of uses which can be made of the material but the invention is not necessarily restricted to these particular usages.

For use in sutures, any size may be used, depending upon the desires of the surgeon. In the United States the more common standard sizes are the standard United States Pharmacopeia sizes (United States Pharmacopeia Convention, Inc., Distributed by Mack Publishing Co., Easton, Pa., elsewhere abbreviated U.S.P.):

| U.S.P. size | U.S.P. diameter (inches max.) |
|---|---|
| 6-0 | 0.004 |
| 5-0 | 0.006 |
| 4-0 | 0.008 |
| 3-0 | 0.010 |
| 00 | 0.013 |
| 0 | 0.016 |

The sutures can be either monfilament or from twisted or braided polyfilaments. For monofilaments, the diameters are usually governed by standard sizes, accepted by surgeons, in the United States, the U.S. Pharmacopeia sizes are preferred. The diameters are as specified. For twisted or braided polyfilamentary sutures, filaments from about 1 to 4000 denier are used to construct the sutures.

We claim:

1. In a surgical needle and suture combination the improvement comprising a suture of at least one filament of stretched and oriented normally solid polyhydroxyacetic ester, said needle and suture being sterile, and the polyhydroxyacetic ester having sufficient heat resistance to withstand autoclaving, good knotability, good knot strength, and good handleability, the total denier of the suture being from 1 to 4,000.

2. In a surgical needle and suture combination the improvement comprising:
    a suture consisting of at least one filament of stretched and oriented normally solid polyhydroxyacetic ester, the said surgical needle and suture being sterile;
    the said suture
    having good knotability, good knot strength, good handleability, ready colorability and a total denier of from 1 to 4,000,
    retaining a high proportion of its original strength for at least three days when embedded in living muscular tissue,
    being substantially absorbed in 90 days when embedded in living muscular tissue,
    and being substantially free from contaminants not absorbable by living muscular tissue.

3. The surgical needle and suture combination of claim 2 in which the polyhydroxyacetic ester suture is in monofilament form.

4. The surgical needle and suture combination of claim 2 in which the polyhydroxyacetic ester suture is a polyfilamentary strand constructed into a suture having an overall diameter of a size preferred by the medical profession.

5. In a sterilely packaged surgical needle and suture combination the improvement comprising:
    a suture consisting of at least one filament of stretched and oriented normally solid polyhydroxyacetic ester, the said surgical needle and suture being sterile;
    the said suture
    having good knotability, good knot strength, good handleability, ready colorability and a total denier of from 1 to 4,000,
    retaining a high proportion of its original strength for at least three days when embedded in living muscular tissue,
    being substantially absorbed in 90 days when embedded in living muscular tissue,
    and being substantially free from contaminants not absorbable by living muscular tissue,
    said needled suture being retained in storage and sterile until ready for use.

6. The suture package of claim 5 in which the suture is a monofilament of polyhydroxyacetic ester.

7. The suture package of claim 5 in which the suture consists of a plurality of filaments of polyhydroxyacetic ester.

8. A method of closing a wound of living tissue which comprises:
    sewing the edges of the wound with a surgical suture consisting of at least one filament of stretched and oriented normally solid polyhydroxyacetic ester, said suture being sterile; the said suture having good knotability, good knot strength, good handleability, ready colorability, and a total denier of from 1 to 4,000, retaining a high proportion of its original strength for at least three days when embedded in living muscular tissue, being substantially absorbed in 90 days when embedded in living muscular tissue, and a proportionate time in other tissue, and being substantially free from contaminants not absorbable by living muscular tissue,
    embedding the suture in living tissue and
    leaving the suture in said tissue until said element is absorbed by the tissue during the healing process.

9. A method of retaining living tissue in a desired location and relationship during a healing process which comprises:
    positioning and emplacing living tissue with a surgical element of normally solid polyhydroxyacetic ester,
    said polyhydroxyacetic ester having good handleability,
    embedding said element in living tissue and
    leaving said element in said tissue until said element is absorbed by the tissue during the healing process, the element retaining a high proportion of its original strength for at least three days and being substantially absorbed in 90 days when the living tissue is muscular tissue, and a proportionate time in other tissues.

References Cited by the Examiner
UNITED STATES PATENTS

| 2,615,450 | 10/1952 | Bower | 128—335.5 |
| 2,676,945 | 4/1954 | Higgins | 260—78.3 X |
| 2,764,159 | 9/1956 | Masci et al. | 128—335.5 X |
| 2,870,906 | 1/1959 | Harkness et al. | 206—63.3 |
| 2,909,177 | 10/1959 | Dowd et al. | 128—335.5 |
| 3,044,942 | 7/1962 | Baptist | 128—334 X |

RICHARD A. GAUDET, Primary Examiner.

DALTON L. TRULUCK, Examiner.